Nov. 21, 1961     A. R. CARLSON     3,010,071
SWEEP CIRCUIT
Filed May 19, 1960
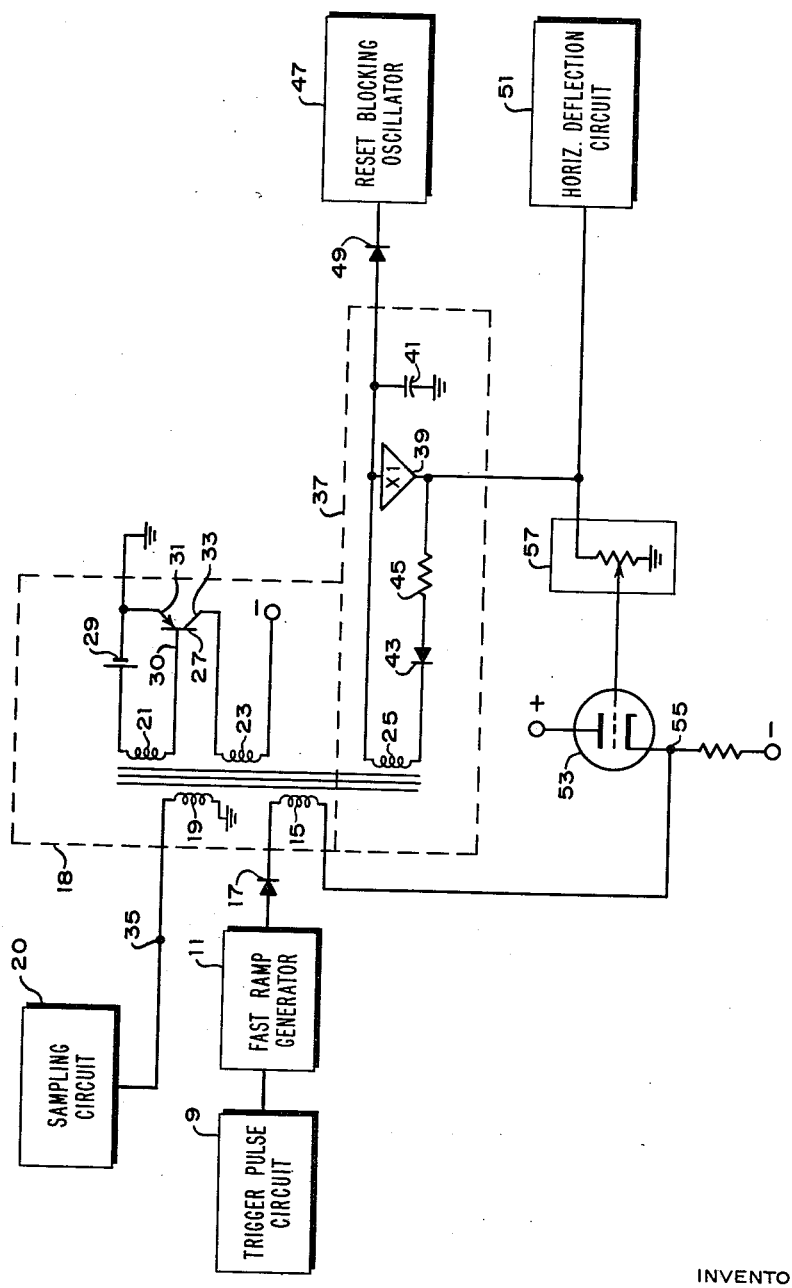
INVENTOR
ALAN RODERICK CARLSON
BY
ATTORNEY

United States Patent Office 3,010,071
Patented Nov. 21, 1961

3,010,071
SWEEP CIRCUIT
Alan Roderick Carlson, Palo Alto, Calif., assignor to Hewlett-Packard Company, Palo Alto, Calif., a corporation, of California
Filed May 19, 1960, Ser. No. 30,251
11 Claims. (Cl. 328—186)

This invention relates to sweep circuits of the type used in sampling oscilloscopes.

In a sampling oscilloscope a complete waveform is not displayed once per time-base as in conventional oscilloscopes. Instead, a sample measurement is made at a selected point which is moved incrementally in time along the waveform at each successive recurrence. In this way the shape of the waveform under examination can be traced as a series of samples or dots on the screen of a cathode ray display tube during the time occupied by a number of recurring waveforms. Sampling oscilloscope techniques are described in U.S. Patent 2,280,524 and 2,280,531 issued April 21, 1942 to S. Hansen and D. E. Norgaard respectively, and in British Patent 692,615 published June 10, 1953.

The sweep circuit of a sampling oscilloscope should provide the horizontal displacement of successive samples along the displayed waveform as a function of time. In one known sweep circuit, a slow linear ramp voltage is applied to the horizontal deflection plates. At each recurring waveform, a fast linear voltage is generated. A coincidence detector or voltage comparator is used to determine the instant when this sweep voltage crosses the ramp voltage. At that instant, a very short sampling pulse is generated with an amplitude proportional to the level of the waveform at the corresponding point in time. Thus, with each successive recurrence of the waveform under examination, the sampling point moves with equal increments along the waveform, provided the period between the recurring waveforms remains constant. For aperiodically recurring waveforms, the samples are unevenly displaced in time, and as a result the waveform under examination is displayed as a series of randomly spaced samples or dots on the display screen. It is desirable, then, to use a sweep voltage that varies as a function of the number of recurrences of the waveform rather than as a function of time. A sweep voltage that incrementally increases in amplitude for each recurrence of the waveform, such as a staircase voltage, provides a trace of uniformly spaced samples, independent of the periodicity of the recurring waveform. Such a staircase voltage should comprise constant amplitude steps so that the horizontal position of a given sample does not vary.

If corresponding samples in successive cycles of the waveform are not taken at precisely the same point for each recurrence, the waveform appears to jitter on the display screen. Small variations in the position of corresponding samples in successive recurrences of the waveform can be attributed to the coincidence detector or voltage comparator that is used to detect the coincidence of the sweep and ramp voltages. If the comparator is only capable of detecting coincidence between two voltages to within something of the order of a millivolt due, for example, to the presence of noise, then time jitter in the displayed waveform results.

It is sometimes necessary to observe a particular portion of the displayed waveform in more detail. For this purpose it is desirable to expand the waveform, then, without varying the sweep or sampling rate. One such device is a time scale magnifier which expands the apparent time base of the displayed waveform and thus permits scanning over a particular portion of the waveform under examination.

Accordingly, it is the principal object of the present invention to provide a voltage comparator circuit that will reduce the apparent time jitter of the waveform displayed by a sampling oscilloscope.

It is another object of this invention to provide a staircase voltage generating circuit that will maintain a relatively level step of voltage over a long sampling period and thereby provide a stable time-base for slower sampling rates.

It is still another object of the present invention to provide a time scale magnifying circuit that will expand the time base of the displayed waveform.

In accordance with the illustrative embodiment of this invention a voltage comparator circuit is provided which is capable of precisely detecting coincidence between a generated staircase voltage and a fast ramp voltage and which provides a sampling trigger pulse at the precise instant of coincidence. In accordance with one of the aspects of this invention, a staircase voltage generator is provided which has a very high impedance discharge path in the storage capacitor circuit and which is thus capable of producing incremental voltage steps that maintain a substantially constant amplitude over relatively long sampling periods. The constant amplitude steps provide a stable time-base for slower sampling rates. In accordance with another aspect of the present invention, a time scale magnifying circuit comprising a voltage attenuator is provided which expands the time-base of the displayed waveform.

Other and incidental objects of this invention will be apparent from a reading of this specification and an inspection of the accompanying drawing which shows a schematic diagram of an embodiment of this invention.

Referring to the drawing, the synchronizing pulses from the trigger circuit 9 are applied to the fast ramp generator 11. The output of generator 11 is connected to one input terminal on winding 15 of the comparator circuit through diode 17. The comparator circuit 18 comprises a transformer with windings 15, 19, 21, and 23, transistor 27, and bias supply 29. One terminal of winding 21 is connected to the base electrode 30 of transistor 27. The other terminal of winding 21 is connected to the emitter electrode 31 through the series bias supply 29. One terminal of a direct current power supply is connected to the collector electrode 33 through winding 23. The emitter electrode 31 is connected to any convenient reference potential, such as ground. Terminal 35 on winding 19 provides the output signal with respect to ground for triggering the sampling circuit 20. Staircase generator 37 includes another winding 25 on the comparator circuit transformer, one terminal of which is connected to the input of a suitable unity gain amplifier 39 and to the ungrounded terminal of storage capacitor 41. Silicon diode 43 and resistor 45 are serially connected between the other terminal of winding 25 and the output of amplifier 39. The storage capacitor 41 is connected to a reset blocking oscillator 47 through silicon diode 49. The output of the amplifier 39 is connected to the horizontal deflection circuit 51 of the oscilloscope. The other input terminal on winding 15 is connected through a cathode follower 53 and a scale magnifying device 57 to the output terminal of amplifier 39.

The operation of the circuit is as follows: Let us assume that the circuit was initially at rest. An input trigger pulse is applied to the fast ramp generator 11 at the first recurrence of the waveform under examination. The pulse initiates a fast substantially linear ramp at output terminal of fast ramp generator 11 which is coupled to winding 15 by diode 17. The diode 17 conducts at the instant when it is forward biased i.e. when the ramp voltage just exceeds the voltage on the cathode 55. The current which subsequently flows in the forward biased diode 17 and in winding 15, which is wound on the pulse transformer of the blocking oscillator 18, causes base current to flow in transistor 27. Transistor 27 is normally held non-conductive by bias supply 29. The current flowing in the base circuit of transistor 27 causes heavy current to flow through winding 23 in the collector circuit which tends to further increase the base current in transistor 27.

This process continues until the voltage on collector 33, which was initially at the power supply voltage, is reduced to the voltage that appears on emitter 31. At the instant when transistor 27 is saturated, i.e. when the voltages on the collector 33 and the emitter 31 are equal, there is no further rate of change of current in the collector circuit and no rate of change of flux in the core of the pulse transformer and therefore no current in the base circuit of transistor 27. The transistor is thus rendered non-conductive and is held cut off by bias supply 29. The operation just described for blocking oscillator 18 takes place in a time considerably shorter than a microsecond.

During the time that transistor 27 is conducting heavy current through winding 23, a voltage is induced in winding 25. Storage capacitor 41 is thus charged in a direction determined by the silicon diode 43 with a current that is determined by resistor 45. Thus a precise amount of charge is placed on capacitor 41 during the time when blocking oscillator 18 is in the conducting state. The unity gain amplifier 39 which, of course, is referenced to ground through the direct current power supply, is provided to insure that a constant amount of charge is placed on capacitor 41 independent of the voltage across the capacitor. The circuitry of staircase generator 37, then, is substantially a constant current source and a storage capacitor, which current source adds a precise amount of charge to the storage capacitor during the time when the blocking oscillator 18 is in the conducting state.

The voltage which appears across capacitor 41 also appears at the output terminal of amplifier 39, as the input terminal of the time scale magnifier 57 and at the input to the horizontal deflection circuit 51. The operation of the time scale magnifier will be described hereinafter.

Assuming that the time scale magnifier 57 has a transmission of unity, then the voltage that appears on cathode 55 will be substantially equal to the voltage that appears on capacitor 41. Also the horizontal deflection circuit will cause the displayed sample to be deflected horizontally by an amount proportional to the voltage appearing on capacitor 41.

At a subsequent recurrence of the waveform under examination, another trigger pulse will be applied to the fast ramp generator 11 which will initiate a ramp voltage at output terminal thereof. Diode 17 will now conduct when the ramp voltage at the output terminal of generator 11 is substantially equal to the small voltage appearing on the cathode 55, which conduction occurs at an incrementally later time relative to the application of the trigger pulse. Each time diode 17 is rendered conductive, the blocking oscillator 18 fires, producing a voltage on winding 25 and triggering the sampling circuit 20. Each time a voltage is induced in winding 25, an incremental amount of charge is added to storage capacitor 41. Since the voltage across a fixed capacitor, such as capacitor 41, is proportional to the charge thereon, a staircase voltage is generated in the manner just described which is a function of the number of applied trigger pulses.

It can be seen, in this manner, that the time when blocking oscillator 18 fires relative to the time of the application of the trigger pulse, is incrementally retarded for each recurrence of the waveform under examination. It can also be seen that successive displayed samples are horizontally displaced an incremental distance by the horizontal deflection circuit for each recurrence of the waveform under examination.

This process continues until the amplitude of the staircase voltage attains a predetermined value. Reset blocking oscillator 47 and silicon diode 49 are connected to discharge the stored voltage on capacitor 41 when the amplitude of the voltage on capacitor 41 is sufficient to render the diode 49 conductive. Thus a reset for the staircase generator 37 is provided. Suitable means, such as winding 19, are provided to obtain an output signal from the blocking oscillator 18, which output signal is used to trigger the sampling circuit.

Time scale magnifier 57 is a resistance divider which serves to reduce the voltage that appears on the cathode 55 for a given voltage appearing at the output terminal 39 of the staircase generator 37. By attenuating the staircase voltage before comparing it with the fast ramp voltage, only a portion of the recurring waveform is scanned which is proportional to the attenuation ratio achieved in the time scale magnifier 57. This results in an apparent expansion of the time base of the displayed waveform.

It can be seen from the foregoing, that I have provided a voltage comparator circuit that is capable of precisely detecting a predetermined relationship between two applied voltages. Also I have provided a separate staircase voltage generator which has a very high impedance leakage discharge path, thereby providing substantially constant amplitude voltage steps over long sampling periods.

Further, I have provided a circuit that will expand the apparent time-base of the displayed waveform.

I claim:

1. In a sweep circuit, means responsive to trigger pulses applied thereto for generating a ramp voltage as a substantially linear function of time, means responsive to said trigger pulses for generating a staircase voltage as a function of the number of said trigger pulses applied thereto, a voltage comparator including one output and two input terminals, means to apply said ramp voltage to one input terminal of said voltage comparator, resistive means to apply said staircase voltage to the other input terminal of said voltage comparator, said voltage comparator producing an output signal when the magnitudes of the two voltages applied to the input terminals thereof bear a predetermined relationship to each other, a sampling circuit, means to apply the output signal of said voltage comparator to said sampling circuit, a horizontal deflection circuit, and means to apply said staircase voltage to said horizontal deflection circuit.

2. In a sweep circuit, means responsive to trigger pulses applied thereto for generating a ramp voltage as a substantially linear function of time, means responsive to said trigger pulses for generating a staircase voltage as a function of the number of said trigger pulses applied thereto, means to reset the said staircase voltage when the amplitude thereof attains a predetermined value, a voltage comparator including one output and two input terminals, means to apply said ramp voltage to one input terminal of said voltage comparator, signal attenuating means to apply said staircase voltage to the other input terminal of said voltage comparator, said voltage comparator producing an output signal when the magnitudes of the two voltages applied to the input terminals thereof bear a predetermined relationship to each other, a sampling circuit, means to apply the output signal of said voltage comparator to said sampling circuit, a horizontal deflection circuit, and means to apply said staircase voltage to said horizontal deflection circuit.

3. In a sweep circuit, means responsive to trigger pulses applied thereto for generating a ramp voltage as a substantially linear function of time, means responsive to said trigger pulses for generating a staircase voltage as a function of the number of said trigger pulses applied thereto, means including a unilateral conducting element and a blocking oscillator to reset the said staircase voltage when the amplitude thereof attains a predetermined value, a voltage comparator including one output and two input terminals, means to apply said ramp voltage to one input terminal of said voltage comparator, voltage divider means to apply said staircase voltage to the other input terminal of said voltage comparator, said voltage comparator producing an output signal when the magnitudes of the two voltages applied to the input terminals thereof bear a predetermined relationship to each other, a sampling circuit, means to apply the output signal of said voltage comparator to said sampling circuit, a horizontal deflection circuit, and means to apply said staircase voltage to said horizontal deflection circuit.

4. The sweep circuit of claim 3 in which the said unilateral conducting element is a silicon diode.

5. The sweep circuit of claim 3 in which the said voltage comparator is a blocking oscillator.

6. In a sweep circuit, means responsive to trigger pulses applied thereto for generating a ramp voltage as a substanitally linear function of time, a blocking oscillator type voltage comparator including a pulse transformer having a plurality of windings thereon, the first of said windings providing said voltage comparator with two input terminals, means including a storage capacitor and a second winding on said pulse transformer to supply equal increments of charge to said storage capacitor for generating a staircase voltage as a function of the number of said trigger pulses applied to said sweep circuit, means to reset said staircase voltage when the amplitude thereof attains a predetermined value, means including a diode to apply said ramp voltage to one input terminal of said voltage comparator, a scale magnifier having an input and an output, means to apply said staircase voltage to the input of said scale magnifier, means connecting the output of said scale magnifier to the other input terminal of said voltage comparator, said voltage comparator producing an output signal when the magnitudes of the two voltages applied to the input terminals thereof bear a predetermined relationship ot each other, a sampling circuit, means to apply the output signal of said voltage comparator to said sampling circuit, a horizontal deflection circuit, and means to apply said staircase voltage to said horizontal deflection circuit.

7. In a sweep circuit, means responsive to trigger pulses applied thereto for generating a ramp voltage as a substanitally linear function of time, a blocking oscillator type voltage comparator including a pulse transformer having a plurality of windings thereon, the first of said windings providing said voltage comparator with two input terminals, means including a storage capacitor and a second winding on said pulse transformer to supply equal increments of charge to said storage capacitor for generating a staircase voltage as a function of the number of said trigger pulses applied to said sweep circuit, means including a blocking oscillator and a unidirectionally conducting device to reset said staircase voltage when the amplitude thereof attains a predetermined value, means including a diode to apply said ramp voltage to one input terminal of said voltage comparator, a scale magnifier having an input and an output, means to apply said staircase voltage to the input of said scale magnifier, means connecting the output of said scale magnifier to the other input terminal of said voltage comparator, said voltage comparator producing an output signal when the magnitudes of the two voltages applied to the input terminals thereof bear a predetermined relationship to each other, a sampling circuit, means to apply the output signal of said voltage comparator to said sampling circuit, a horizontal deflection circuit, and means to apply said staircase voltage to said horizontal deflection circuit.

8. The sweep circuit of claim 7 in which the said unidirectionally conducting element is a silicon diode.

9. The sweep circuit of claim 7 in which the said scale magnifier is a resistance attenuator.

10. In a sweep circuit, means responsive to trigger pulses applied thereto for generating a ramp voltage as a substantially linear function of time, a blocking oscillator type voltage comparator including a pulse transformer having a plurality of windings thereon, the first of said windings providing said voltage comparator with two input terminals, means including a storage capacitor and serially connected suitable amplifier, resistor, unidirectional conducting element, and second winding on said pulse transformer to supply equal increments of charge to said storage capacitor for generating a staircase voltage as a function of the number of said trigger pulses applied to said sweep circuit, means including a blocking oscillator and a silicon diode to reset said staircase voltage when the amplitude thereof attains a predetermined value, means including a diode to apply said ramp voltage to one input terminal of said voltage comparator, a resistance attenuator having an input and an output, means to apply said staircase voltage to the input of said resistance attenuator, means connecting the output of said resistance attenuator to the other input terminal of said voltage comparator, said voltage comparator producing an output signal when the magnitudes of the two voltages applied to the input terminals thereof bear a predetermined relationship to each other, a sampling circuit, means to apply the output signal of said voltage comparator to said sampling circuit, a horizontal deflection circuit, and means to apply said staircase voltage to said horizontal deflection circuit.

11. The sweep circuit of claim 10 wherein the said unidirectional conducting element is a silicon diode.

No references cited.